Feb. 12, 1957  D. F. WALKER  2,781,170
ELECTRICAL COMPUTING INSTRUMENTS
Filed Dec. 12, 1951

Inventor
Donald F. Walker
By Young, Emery & Thompson
Attorneys

United States Patent Office 2,781,170
Patented Feb. 12, 1957

2,781,170

ELECTRICAL COMPUTING INSTRUMENTS

Donald Ferguson Walker, Hollinwood, England

Application December 12, 1951, Serial No. 261,218

Claims priority, application Great Britain May 21, 1947

5 Claims. (Cl. 235—61)

This invention relates to electrical computing instruments and is a continuation-in-part of application No. 27,990, now Patent No. 2,608,345, and more particularly concerns computing instruments for the purpose of indicating or deriving the value of one unknown quantity of a problem to be solved from three known quantities where the latter quantities are capable of being represented by sufficient of the lengths of sides or values of angles to determine a triangle uniquely, the unknown quantity being one of the data not supplied, i. e. being represented by the length of a side or the value of an angle. Such problems are of frequent occurrence in connection with artillery predictors, navigational computers, and the like.

It is of course possible to draw a triangle from the data supplied and by measuring the appropriate side or angle determine the unknown quantity; but this procedure is often inconvenient to apply, particularly where one or more of the known quantities is or are continuously changing.

In United States specification No. 27,990, now Patent No. 2,608,345, I have described an electrical computing instrument for automatically and continuously deriving the unknown quantity for visible indication thereof or for application to a further computer stage, this instrument comprising a uniform resistance having a first control associated with a variable tapping, two points of said uniform resistance, symmetrically disposed with respect to its mid-point, being connected to a common lead by way of equal first and second impedance means respectively for yielding potentials $v_1$ and $v_2$ proportional to the currents flowing through them respectively, a source of electrical energy connected across said variable tapping and said common lead, means for applying a voltage proportional to $(v_1+v_2)$ to a cosine potentiometer having a second control, thus yielding an output voltage proportional to $\frac{1}{2}(v_1+v_2)(1-\cos\theta)$, where $\theta$ is the angle represented by the position of said second control, means for applying a difference voltage proportional to the difference between $v_2$ and said output voltage to means having a third control for deriving an out-of-balance current for actuating a motor for adjusting one of said controls when the other two of said controls are pre-set, in order to bring the quantity represented by the position of the motor-adjusted control into conformity with the triangle representing said known quantities.

In the embodiment described with reference to Figure 2 of that specification, the means for applying a voltage proportional to $(v_1+v_2)$ to a cosine potentiometer included a reversing transformer. This arrangement works satisfactorily but has the disadvantage that the interaction between the primary and secondary currents of the transformer causes the currents in one of the impedance means to affect the currents in the other, and vice versa, thereby lessening the accuracy of the computation.

The object of the present invention is to provide the electrical computing instrument with means for applying a voltage proportional to $(v_1+v_2)$ to a cosine potentiometer which is substantially free from the above described disadvantage.

In accordance with the present invention the said means for applying a voltage proportional to $(v_1+v_2)$ to a cosine potentiometer includes a negative-feedback high-gain amplifier.

The input to said negative feedback amplifier may be derived from said common lead and the mid-point of an impedance of large value compared with the impedance of said cosine potentiometer and the values of said first and second impedance, said large impedance being connected in series with said potentiometer between said two points on said uniform resistance, and said potentiometer may be so included in the output circuit of said amplifier that the potential of the common point of said potentiometer and said large impedance is maintained in opposite phase to the potential of the mid-point of said large impedance.

Neutralizing means may be provided to counteract the current which the voltage across said cosine potentiometer would otherwise cause to flow in that one of said impedance means to which said cosine potentiometer is connected direct.

Figure 3:
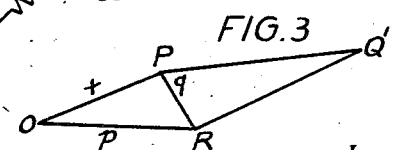
Figure 3 is a diagram illustrating the principle of the invention.

As described in the specification of the parent application and shown in Figure 3 hereof, the electrical computing instrument in accordance with the invention provides from the foregoing pulse and bearing information received in the aircraft an immediate indication at any instant of the aircraft's distance from the master station R, thus simplifying and accelerating the ascertainment of the aircraft's position. An aircraft at P receives navigational information in the form of pulse signals radiated from a fixed master station R and its fixed associated slave station Q. Pulses are transmitted cyclically from these stations, each cycle comprising a pulse transmitted from the master station followed by a pulse transmitted from the slave station; the time interval between each such pair of pulses is very accurately adjusted to a constant known value. The instrument, in effect, "solves" the triangle PQR when the following information is set into it, the geometrical convention being observed of referring to the angles of the triangle by the capital letters P, Q, and R and the sides opposite these angles by the lower case letters $p$, $q$ and $r$ respectively; (a) the length of the first side $p$; (b) the difference obtained by subtracting the length of the second side $q$ from the length of the third side $r$, i. e. $(r-q)$; and (c) the value of the angle R between the first and second sides $p$ and $q$. Item (a) is constant and is known. Item (b) is obtained from the pulse receiving equipment carried by the aircraft, the cathode ray tube screen of which is calibrated to provide this information direct from the spacing of the pulses along a horizontal time-base. Item (c) is obtained from the direction-finding equipment, also carried by the aircraft. The unknown quantity derived by the instrument is the length of the second side $q$, i. e. the distance of the aircraft from the master station R.

Figure 1:
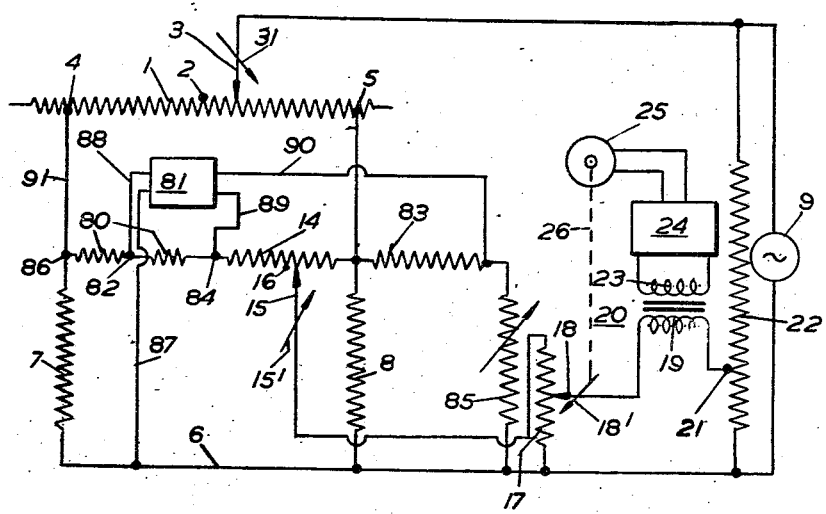
Figure 1 is a circuit diagram to illustrate one embodiment of the invention.

As shown in Figure 1 a uniform resistance 1 has a mid-point 2 and a variable tapping 3 adjustable by a control 31. Two fixed points 4, 5 on this resistance, symmetrically disposed with respect to mid-point 2, i. e. so that the resistance between points 2 and 4 is equal to that between points 2 and 5, are connected to a common conductor lead 6 by way of equal first and second impedance means in the form of equal fixed resistances 7 and 8 respectively. A source 9 of A. C. electrical energy is connected across tapping 3 and common lead 6.

The end of the impedance 7 that is remote from the common lead 6 is connected to the point 4 by a lead 91. Cosine potentiometer 14 is connected to the lead 91 and thus to the fixed point 4 by way of a large impedance in the form of a large resistance 80 the value of which is about two thousand times greater than that of resistances 7 or 8 or potentiometer 14. A high gain amplifier 81 has one of its input terminals connected by a conductor 87 to the common lead 6 and the other connected by conductor 88 to the mid-point 82 of the resistance 80. In series with the potentiometer 14 is a first neutralizing impedance in the form of a resistance 83 of equal value and across this series combination is applied the output conductor leads 89, 90 of the amplifier 81 in such sense that the potential of the common point 84 of the potentiometer 14 and the large resistance 80 is maintained in opposite phase to the potential of the mid-point 82. Between the common lead 6 and that end of resistance 83 that is connected to the amplifier is connected a second neutralizing impedance in the form of an adjustable resistance 85 the value of which is approximately equal to half that of resistance 80.

The cosine potentiometer 14 has a variable tapping 15 adjustable by a control $15^1$. Potentiometer 14 operates according to a cosine law with respect to its mid-point 16, i. e. linear movement of tapping 15 in proportion to the value of a given angle $\theta$ alters the resistance between tapping 15 and mid-point 16 in proportion to cos $\theta$; when $\theta$ is 90 degrees the tapping is at mid-point 16; the end 84 of the potentiometer 14 corresponds to 180 degrees and the other end to zero degrees. Between tapping 15 and common lead 6 is connected a linear variable potentiometer 17 having a variable tapping 18, adjustable by a control $18^1$, connected by way of the primary 19 of a control transformer 20 to a tapping 21 on a fixed potentiometer 22 connected across the supply 9. The output from the secondary 23 of the transformer 20, after amplification by amplifier 24, is applied to a servo motor 25 that operates control $18^1$ to adjust the position of tapping 18 of potentiometer 17 by means of a suitable drive indicated by 26.

In operation, by means of associated apparatus that forms no part of this invention, tapping 3 of uniform resistance 1 is maintained by means of control 31 in such a position that the resistance between the tapping and mid-point 2 of the resistance is always proportional to the difference length $(r-q)$ on a scale that makes the resistance between midpoint 2 of resistance 1 and common lead 6, either by way of resistance 7 or resistance 8, correspond to the length of the base $p$; the resistance of these two parallel paths between point 2 and lead 6 are obviously equal. Tapping 15 of cosine potentiometer 14 is similarly maintained by means of control $15^1$ so that the angle $\theta$ corresponds to the angle R, the voltage between tapping 15 and mid-point 16 being therefore proportional to cos R. As is demonstrated below, the difference voltage applied to potentiometer 17 i. e. the voltage between tapping 15 and common lead 6, is proportional to $$\frac{1}{q}$$

the reciprocal of the length of the required side. The combination of the linear and fixed potentiometers 17 and 22 serves to invert this reciprocal, as will be made clear later, so that when the resultant, i. e. the output, voltage of potentiometer 17 is balanced by the output voltage of fixed potentiometer 22, i. e. the voltage between tapping 21 and common lead 6, the position of tapping 18 relative to common lead 6 is in conformity with the triangle representing the known quantities, and so is proportional to the length of side $q$, which length, or the quantity it represents, may be read off on a linear scale adjacent to control $18^1$. When these voltages are not equal an out-of-balance current flows in transformer 20; the amplified secondary voltage then operates servo motor 25, which adjusts tapping 18 through control $18^1$ and drive 26 in such a direction as to bring the output voltages into balance; when this is attained the out-of-balance current ceases to flow and motor 25 ceases to operate. This adjusting procedure may occur continuously, controls 31 and $15^1$ being continuously adjusted by the associated apparatus whilst control $18^1$ is continuously adjusted in response thereto, as above described, by the apparatus in accordance with the invention, thus giving a continuous indication of the value of $q$.

The operation of the above equipment will be made clearer by the following theoretical explanation.

A standard trigonometrical formula for the triangle PQR is $$r^2 = p^2 + q^2 - 2pq \cos R \qquad (1)$$

As we are given $(r-q)$ we may substitute $(q+r-q)$ for $r$;

hence $(q+r-q)^2 = p^2 + q^2 - \cos R$, from which may be derived the equation:

$$\frac{1}{q} = \frac{1+\cos R}{p-(r-q)} - \frac{1-\cos R}{p+(r-q)} \qquad (2)$$

Reverting now to the apparatus above described, as already stated the resistance between mid-point 2 of resistance 1 and common lead 6 by way of either of fixed resistances 7 or 8 represents the length of side $p$. When the resistance between tapping 3 and mid-point 2 is proportional to $(r-q)$ as above described, the resistances of the two parallel paths between tapping 3 and common lead 6 become $p+(r-q)$ and $p-(r-q)$. Using the suffix 1 when referring to the parallel path between tapping 3 and common lead 6 by way of point 4 and resistance 7 and the suffix 2 when referring to the other parallel path we get for the currents $i_1$ and $i_2$ in the two paths:

$$i_1 \alpha \frac{1}{p+(r-q)}$$

and $$i_2 \alpha \frac{1}{p-(r-q)} \qquad (3)$$

The voltages $v_1$ and $v_2$ developed across resistances 7 and 8 respectively and applied to cosine potentiometer 14 are respectively proportional to the above currents, since the values of fixed resistances 7 and 8 are equal. Voltage $v_1$ is reversed in polarity by the amplifier 81 so that (as hereinafter described more fully) it is the sum of voltages $v_1$ and $v_2$, rather than the difference, that is applied to cosine potentiometer 14. The voltage developed between tapping 15 and mid-point 16 of this potentiometer is therefore proportional to $$½(v_1+v_2)\cos \theta$$

and the voltage between tapping 15 and the end of potentiometer 14 connected to resistance 8 (it is assumed for the moment that the value of $\theta$ lies between 0 and 90 degrees) is proportional to $$½(v_1+v_2)(1-\cos \theta) \qquad (4)$$

The voltage given in (4) subtracted from $v_2$ is thus the difference voltage ($v_3$, say) between tapping 15 and common lead 6. Hence:

$$v_3 \alpha v_2 - ½(v_1+v_2)(1-\cos \theta) \qquad (5)$$

On substituting for $v_1$ and $v_2$ the values from (3) to which $i_1$ and $i_2$ are proportional and substituting R for $\theta$ we get:

$$v_3 \alpha \frac{1+\cos R}{p-(r-q)} - \frac{1-\cos R}{p+(r-q)} \qquad (6)$$

Hence, from Expression 2, $$v_3 \propto \frac{1}{q}$$

Let the fractions of the resistances of the linear and fixed potentiometers 17 and 22 between tappings 18 and 21 and common lead 6 be $s$ and $t$ respectively. Then when the resultant voltage $s.v_3$ developed between tapping 18 and common lead 6 is balanced by the output voltage of potentiometer 20 so that no out-of-balance current flows we get:

$$s \cdot v_3 = t \cdot v$$

where $v$ is the supply voltage hence $$\frac{s}{q} = t.v, \text{ or } s \alpha q$$

The setting of tapping 18 relative to common lead 6, as indicated by control 18¹, is thus proportional to the length $q$ required and hence to the result of the computation. The tapping 21 on fixed potentiometer 22 to give the fixed fraction $t$ is chosen so as to allow of a convenient range of adjustment of tapping 18.

When R is between 90 and 180 degrees, tapping 15 of cosine potentiometer 14 operates on the other side of mid-point 16. The term $(1-\cos R)$ in Expression 4 (with R substituted for $\theta$) becomes $(1+\cos R)$, $\cos R$ itself being now a negative term.

Similarly when the length of side $q$ is greater than the length of side $r$ tapping 3 of resistance 1 operates on the other side of mid-point 2. The expression $(r-q)$ now becomes negative but the correct result again appears at linear potentiometer 17.

The instrument as above described may with slight modifications be used where the known quantities are such as may be represented by all three sides of a triangle, the length of the base being constant and the unknown quantity being represented by one of the base angles. In this case the triangle representing the problem is arranged so that the wanted base angle is the base angle R. The equal resistances between mid-point 2 and common lead 6 are made to correspond to the constant length of the side $p$ and the drive 26 is connected to control 15¹ instead of to control 18¹. Controls 31 and 18¹ are then adjusted by hand, or continuously adjusted by the associated apparatus to represent the length $(r-q)$ and the length $q$ respectively, whilst motor 25 maintains control 15¹ in conformity with the triangle representing the problem, i. e. so that the angle $\theta$ becomes angle R and may be read off from the scale associated with control 15¹.

If the known quantities are such as may be represented by the fixed base $p$ the side $q$ and the included angle R, the unknown quantity being the side $r$, controls 15¹ and 18¹ are adjusted to represent R and $q$ respectively whilst the motor maintains control 3¹ in conformity. The answer derived from the position of control 3¹ will be $(r-q)$, from which the value of $r$ may be obtained by adding the known quantity $q$, e. g. by means of a differential gear.

Negative feedback from the output to the input circuits of the amplifier 81 is provided by that half of resistance 80 between points 84 and 82; and as a result of this the potential of point 82 with respect to common lead 6 is maintained at a very small value, approximating to zero, in accordance with the known operation of negative feedback amplifiers. The higher the gain of amplifier 81 the closer does the potential of point 82 approximate to zero; by making the gain high enough this potential may accordingly be made to approximate to zero with sufficient accuracy for the computation. As point 82 is the mid-point of resistance 80 the potential at this point must be the average of the potentials at the ends 84 and 86 of this resistance. If then the potential at point 82 is maintained at very nearly zero the potential at point 84 must be equal and opposite the potential of point 86. But the latter potential is the voltage across resistance 7, i. e., $v_1$. Hence the voltage between point 84 and common lead 6 is $-v_1$. And hence the voltage across potentiometer 14 is $(v_1+v_2)$ where $v_2$ is the voltage across resistance 8, so that the voltage between mid-point 16 and one end of potentiometer 14 is $\frac{1}{2}(v_1+v_2)$. The amplifier thus performs the required reversal of polarity as was performed by reversing transformer 11 in the embodiment described in the main specification with reference to Figure 2.

The output of amplifier 81 is applied across resistance 83 and potentiometer 14 in series, instead of merely across the latter, in order to provide neutralizing means for counteracting the current which the voltage developed across potentiometer 14 would otherwise cause to flow in resistance 8, by way of common lead 6 and resistances 7 and 80, thereby producing an incorrect value of the voltage $v_2$ developed across resistance 8. With the arrangement as shown, a voltage is developed across resistance 83 by the amplifier equal to that developed across potentiometer 14, and the former voltage drives a current through resistance 8, by way of adjustable resistance 85, in the opposite direction to the undesired current to be counteracted. Resistance 85 is adjusted until exact balance is obtained.

Figure 2:
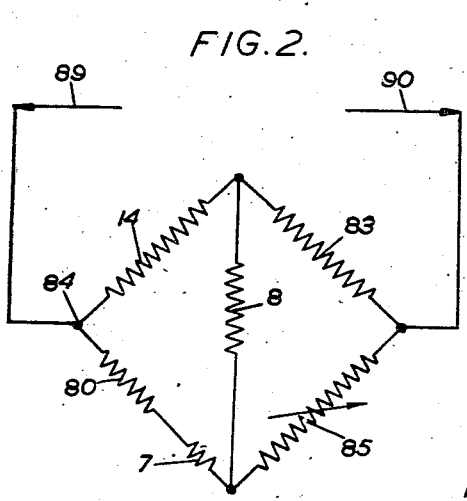
Figure 2 shows part of the diagram of Figure 1 rearranged to clarify the explanation.

This neutralizing system may alternatively be regarded as a bridge network, as shown in Figure 2 of the present specification. The arms of the bridge are $(a)$ potentiometer 14, $(b)$ resistance 83, $(c)$ resistances 80 and 7 in series, and $(d)$ adjustable resistance 85. The output of amplifier 81 is applied across one diagonal of the bridge. No voltage due to the amplifier will therefore appear across the other diagonal, comprising resistance 8, when the bridge is balanced, which occurs when arms $(c)$ and $(d)$ are effectively equal. As resistance 7 is so small in comparison with resistance 80 that it can be neglected it might appear that the approximate value of resistance 85 should be equal to that of resistance 80 instead of being equal to half this value. The reason for this is that the potential at point 82 is maintained virtually at zero with respect to common lead 6 the only effective resistance in arm $(c)$ of the bridge is that between points 82 and 84, i. e. half the value of resistance 80.

Though the same undesired current that has to be counteracted in resistance 8 as described above also flows through resistance 7 it does not here need to be counteracted, for it is here the negative feedback current the existence of which is essential for the correct operation of the amplifier.

The functioning of the remaining parts of the apparatus is exactly as described with reference to Figure 2 of the main specification.

The apparatus described in the present specification may be modified in various ways within the scope of the invention. For example the end of resistance 85 shown connected to common lead 6 may be transferred to point 86. Other neutralizing means may be employed. And the cosine potentiometer 14 may be on the other side of resistance 80.

The apparatus may be modified as described in the specification of the parent application with reference to Figures 3 to 8 thereof.

I claim:

1. An electrical computing instrument, for deriving the value of an unknown quantity of a problem to be solved from three known quantities where the latter can be represented as elements of a triangle, comprising a uniform resistance having two connecting points on said uniform resistance symmetrically disposed with respect to its mid-point, a variable tapping for said resistance, a first control associated with said variable tapping, a conductor element, equal first and second impedance means connecting said two points respectively to the conductor element for yielding voltages $v_1$ and $v_2$ proportional to the currents flowing through them respectively, a source of electrical energy connected across said variable tapping and said conductor element, means for providing a difference voltage proportional to the difference between said voltage $v_2$ and a voltage of value $$\tfrac{1}{2}(v_1+v_2)(1+\cos\theta)$$

said means including a second control, the angle $\theta$ being represented by the position of said second control, said means also including a cosine potentiometer and means for applying a voltage proportional to $(v_1+v_2)$ to said cosine potentiometer, said last mentioned means including a negative-feedback high-gain amplifier, a linear potentiometer having a variable tapping which derives an output voltage proportional to the said difference voltage, connections for applying said difference voltages across said linear potentiometer, reference voltage means connected with said source and providing a reference voltage, out-of-balance current means connected between the variable tapping of said linear potentiometer and said reference voltage means, thereby deriving an out-of-balance current from the difference between the said output voltage from said linear potentiometer and said reference voltage, a third control associated with the said variable tapping of said linear potentiometer, the position of which third control directly determines the value of said out-of-balance current, a motor actuated by said out-of-balance current, and serving to adjust one of said controls when the other two of said controls are pre-set, in order to bring the quantity represented by the position of the motor-adjusted control into conformity with the triangle representing said known quantities.

2. An instrument as claimed in claim 1 having a third impedance of large value compared with the impedance of said cosine potentiometer and the values of said first and second impedances, said third impedance being connected in series with said potentiometer between said two points on said uniform resistance, connections from said common lead and the mid-point of said third impedance to said amplifier constituting input connections to said amplifier, an output connection from said amplifier to one end of said cosine potentiometer at a point of connection of the latter to said large impedance, a second output connection from said amplifier, a fourth impedance means connected between said second output connection and the other end of said cosine potentiometer, said output connections being in such sense that the potential at said point of connection is maintained in opposite phase to the potential of said mid-point of said third impedance means.

3. An instrument as claimed in claim 1 having an impedance of large value compared with the impedance of said cosine potentiometer and the values of said first and second impedances, said large impedance being connected in series with said cosine potentiometer between said two points on said uniform resistance, connections from said common lead and the mid-point of said large impedance to said amplifier constituting input connections to said amplifier, an output connection from said amplifier to one end of said cosine potentiometer at a point of connection of the latter to said large impedance, a second output connection from said amplifier, a fourth impedance means connected between said second output connection and the other end of said cosine potentiometer, said output connections being in such sense that the potential at said point of connection is maintained in opposite phase to the potential of said mid-point of said third impedance means, said cosine potentiometer being directly to one of said first and second impedances, and neutralizing means connected to said cosine potentiometer and counteracting the current which the voltage across said cosine potentiometer could otherwise cause to flow in that one of said first and second impedance means to which said potentiometer is connected direct.

4. An instrument as claimed in claim 1 having an impedance of large value compared with the impedance of said cosine potentiometer and the values of said first and second impedances, said large impedance being connected in series with said potentiometer between said two points on said uniform resistance, connections from said common lead and the mid-point of said large impedance to said amplifier constituting input connections to said amplifier, an output connection from said amplifier to one end of said cosine potentiometer at a point of connection of the latter to said large impedance, a second output connection from said amplifier, a fourth impedance means connected between said second output connection and the other end of said cosine potentiometer, said output connections being in such sense that the potential at said point of connection is maintained in opposite phase to the potential of said mid-point of said third impedance means, said cosine potentiometer being connected directly to one of said first and second impedances, and neutralizing means connected to said cosine potentiometer and counteracting the current which the voltage across said cosine potentiometer could otherwise cause to flow in that one of said first and second impedance means to which said potentiometer is directly connected, said neutralizing means including said fourth impedance which constitutes a first neutralizing impedance, and including also a second neutralizing impedance, said first and second neutralizing impedances being connected in series in that order between the common point of said cosine potentiometer and said one of said impedance means and said common lead, said neutralizing impedances having values approximately equal to that of said cosine potentiometer and half that of said large impedance respectively, and the output of said amplifier being applied across the series combination of said potentiometer and said first neutralizing impedance.

5. An instrument as claimed in claim 1 having an impedance of large value compared with the impedance of said cosine potentiometer and the values of said first and second impedance means, said large impedance being connected in series with said potentiometer between said two points on said uniform resistance, connections from said conductor element and the mid-point of said large impedance to said amplifier constituting input connections to said amplifier, an output connection from said amplifier to one end of said cosine potentiometer at a point of connection of the latter to said large impedance, a second output connection from said amplifier, a fourth impedance means connected between said second output connection and the other end of said cosine potentiometer, said output connections being in such sense that the potential at said point of connection is maintained in opposite phase to the potential of said mid-point of said third impedance means, said cosine potentiometer being connected directly to the first of said first and second impedance means, and neutralizing means connected to said cosine potentiometer and counteracting the current which the voltage across said cosine potentiometer could otherwise cause to flow in said first impedance means directly connected, said neutralizing means including said fourth impedance which constitutes a first neutralizing impedance, and including also a second neutralizing impedance, said first and second neutralizing impedances being connected in series in that order between the common point of said cosine potentiometer and said first impedance means and said conductor element, said neutralizing impedances having values approximately equal to that of said cosine potentiometer and half that of said large impedance respectively.

References Cited in the file of this patent

UNITED STATES PATENTS

| | | |
|---|---|---|
| 2,581,204 | Reilly | Jan. 1, 1952 |
| 2,587,193 | Miller | Feb. 26, 1952 |
| 2,608,345 | Walker | Aug. 26, 1952 |